United States Patent
Sherman (10) Patent No.: US 10,057,356 B2
(45) Date of Patent: Aug. 21, 2018

(54) POLICY MANAGED SYSTEM AND METHOD THEREOF

(71) Applicant: BAE SYSTEMS INFORMATION AND ELECTRONIC SYSTEMS INTEGRATION INC., Nashua, NH (US)

(72) Inventor: Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 862 days.

(21) Appl. No.: 14/523,172

(22) Filed: Oct. 24, 2014

(65) Prior Publication Data
US 2015/0120898 A1    Apr. 30, 2015

Related U.S. Application Data

(60) Provisional application No. 61/896,327, filed on Oct. 28, 2013.

(51) Int. Cl.
| G06F 15/173 | (2006.01) |
| H04L 29/08 | (2006.01) |
| H04L 29/06 | (2006.01) |
| H04L 12/24 | (2006.01) |

(52) U.S. Cl.
CPC .......... *H04L 67/16* (2013.01); *H04L 41/0866* (2013.01); *H04L 41/0893* (2013.01); *H04L 63/20* (2013.01)

(58) Field of Classification Search
CPC . H04L 67/16; H04L 41/0866; H04L 41/0893; H04L 41/5045; H04L 63/20
See application file for complete search history.

(56) References Cited

U.S. PATENT DOCUMENTS

| 8,234,258 B2 * | 7/2012 | Palmer .............. G06F 17/30864 |
| | | 707/694 |
| 8,533,782 B2 * | 9/2013 | Soppera ................ G06F 21/604 |
| | | 726/1 |
| 9,426,178 B1 * | 8/2016 | Yanovsky ............... H04L 63/20 |
| 9,473,946 B2 * | 10/2016 | Kasslin ................. H04W 16/14 |

(Continued)

FOREIGN PATENT DOCUMENTS

WO    WO 2004/002062    * 12/2003

*Primary Examiner* — Yves Dalencourt
(74) *Attorney, Agent, or Firm* — Sand & Sebolt, LPA (57) ABSTRACT

A method and a system of managing a policy managed system that includes a policy managed element. The method restricts the policy managed element so that internal configurations and actions of the policy managed element do not violate any policy rules generated external to the policy managed element. The method also prevents the policy managed element from generating policy that exit the policy managed element. The method, at a policy executive element (PEE) located remote from the policy managed element, restricts internal configurations and actions of the PEE so that the PEE does not violate any policy rules generated external to the PEE. The PEE includes a policy generation point (PGP) that the method allows to generate new policy rules that do not violate any existing policy and provides the new policy rules to the policy managed element.

20 Claims, 5 Drawing Sheets

(56) References Cited

U.S. PATENT DOCUMENTS

| | | | |
|---|---|---|---|
| 2003/0115322 A1* | 6/2003 | Moriconi | G02B 6/132 709/224 |
| 2008/0120264 A1* | 5/2008 | Lee | H04L 41/0893 706/47 |
| 2008/0163334 A1 | 7/2008 | Perich et al. | |
| 2009/0154599 A1* | 6/2009 | Siti | H04L 1/0052 375/320 |
| 2011/0319123 A1* | 12/2011 | Kwun | H04W 52/16 455/522 |
| 2013/0291055 A1* | 10/2013 | Muppidi | H04W 12/08 726/1 |
| 2015/0134789 A1* | 5/2015 | Kekki | H04L 41/0893 709/221 |
| 2016/0088608 A1* | 3/2016 | Lindoff | H04W 8/18 455/452.1 |

* cited by examiner

FIG-5

POLICY MANAGED SYSTEM AND METHOD THEREOF

CROSS REFERENCE TO RELATED APPLICATION

This application claims priority from U.S. Provisional Application Ser. No. 61/896,327, filed Oct. 28, 2013; the disclosure of which is incorporated herein by reference.

BACKGROUND OF THE INVENTION

1. Field of Invention

The current invention relates generally to apparatus, systems and methods related to Policy Management and Policy Managed Devices. More particularly, the apparatus, systems and methods relate to implementing policy managed elements and policy management systems. Specifically, the apparatus, systems and methods provide for generic methods and systems that are broadly applicable to policy managed elements and policy management systems (independent of application).

2. Description of Related Art

Policy Management and Policy Managed Devices are areas of great interest today, particularly for networked systems. The idea is that the rules of behaviour for these devices can be changed based on high level guidance provided by some supervisory entity. Examples of such supervised devices are network routers and cognitive radios. These devices can accept guidance such as (for example) permitted or prohibited routes, and permitted or prohibited frequencies. Of course policies can be much more complex, which has led to the development of entire languages for policy, such as the eXtensible Access Control Markup Language (XACML) and derivatives of languages such as the Web Ontology Language (OWL).

A number of architectures have been defined to describe the use of policy in these contexts. For instance RFC 3198, "Terminology for Policy-Based Management" defines a set of elements to be used in the implementation of policy based management systems. Other related RFC's include RFC 2748, "Common Open Policy Service Protocol"; RFC 2904, "AAA Authorization Framework"; and RFC 2753, "Framework for Policy-based Admission Control". A policy architecture for "dynamic spectrum access" systems and "cognitive" radios is described in the IEEE 1900.5-2011 standard. While some of these standards have common or similar elements, each tailors the elements used for their specific application without defining a general method applicable to all the applications. One key issue is that these point solutions are not generally extensible to situations where there are multiple policy generation points and hierarchies of policy generation. Often the elements controlled by policy may themselves be generating policies for other devices. These situations are not generally covered in any of the policy management methods described today.

What is required is a generic policy management method which would be applicable across a wide range of applications. The method should allow for hierarchical approaches to policy management, and be able to be applied in a large number of policy management applications without being dependent of the specific policy formats and underlying conveyance protocols. Therefore, a better policy management method and system is desired.

SUMMARY

One aspect of an embodiment of the invention includes a policy managed system that includes a network, a policy managed element connected to the network having the ability to accept (sink) policy but not generate (source) policy, and a policy executive element (PEE) connected to the network. The policy managed element has an element configuration manager (ECM) that generates rules and policy for use within the policy managed element, a policy decision manager (PDP) to evaluate an action request against policies before determining if the action conforms with policies and is permitted to execute. The policy managed element further includes a policy enforcement manager (PEP) that sends an action request to the PDP for a decision to determine if the action conforms to current policies. The PEE has the ability to accept (sink) policy and generate (source) policy as well as an ECM for generating policy rules for use within the PEE. The PEE has a PDP that evaluates an action request against policies before determining if the action conforms to policies and is permitted to execute. A PEP of the PEE sends an action request to the PDP for an action decision to determine if the action conforms to existing policies. The PEE further has a policy generation point (PGP) to generate policy that is used by other elements across the system. The policy managed system provides a generic hierarchical structure of policy management that can be applied to a large number of policy management applications without being dependent on specific policy formats and underlying conveyance protocols.

Another aspect of an embodiment may provide a policy managed system comprising: a network creating a communicative link between at least two electronic devices; a first electronic device connected to the network, the first electronic device comprising: (a) a policy executive element (PEE) including the ability to accept (sink) policy and generate (source) policy; (b) a first element configuration manager (ECM) configured to generate rules and policy for use within the PEE; (c) a first policy decision manager (PDP) configured to evaluate an action request against policies before determining if the action conforms with policies and is permitted to execute; (d) a first policy enforcement manager (PEP) configured to send an action request to the first PDP for an action decision to determine if the action conforms with policies; and (e) a first policy generation point (PGP) configured to generate policy that is used by other elements across the system; a second electronic device connected to the network and in communication with the first electronic device through the network, the second electronic device comprising: (a) a policy managed element (PME) including the ability to accept (sink) policy but not generate (source) policy, (b) a second ECM configured to generate rules and policy for use within the PME; (c) a second PDP configured to evaluate an action request against policies before determining if the action conforms with policies and is permitted to execute; and (d) a second PEP configured to send an action request to the second PDP for an action decision to determine if the action conforms with policies; and wherein the policy managed system provides a hierarchical structure of policy management that can be applied to a variety of different policy management applications without being dependent on specific policy formats and underlying conveyance protocols.

Another embodiment may provide for a method of managing a policy managed system that includes at policy managed element. The method restricts the policy managed element so that internal configurations and actions of the policy managed element do not violate any policy rules generated external to the policy managed element. The method also prevents the policy managed element from generating policy that exits the policy managed element. The method, at a policy executive element (PEE) located remote from the policy managed element, restricts internal configurations and actions of the PEE so that the PEE does not violate any policy rules generated external to the PEE. The PEE includes a policy generation point (PGP) that the method allows to generate new policy rules that do not violate any existing policy and provides the new policy rules to the policy managed element so that the policy managed element cannot violate the new policy rules.

BRIEF DESCRIPTION OF SEVERAL VIEWS OF THE DRAWINGS

One or more example systems that one or more aspects of the present invention are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Before describing a policy managed system in detail, one configuration of a generalized policy of processing elements and a way of advantageously connecting them is described. The described configuration allows policy management systems to be implemented in a variety of applications. Exemplary applications include management of networked devices such as data stores, radio networks, routers, RF equipment such as Radars, communications systems, navigation equipment, Electronic Warfare equipment, and the like. The methods and systems discussed below can be applied with well-known conveyance protocols such as SNMP, XML, TCP/IP, UDP and many other networking and transport protocols. The most general policy processing element or electronic device may include an Element Configuration Manger (ECM), Policy Decision Point (PDP), Policy Enforcement Point (PEP), Policy Generation Point (PGP), a store of static rules for local use, a store of dynamic rules for local use, a store for externally loaded dynamic rules (policies), etc. While many of these terms are used in other policy management methods, the definitions of those terms as used here will sometime differ from the conventions of other usage context.

Figure 1:
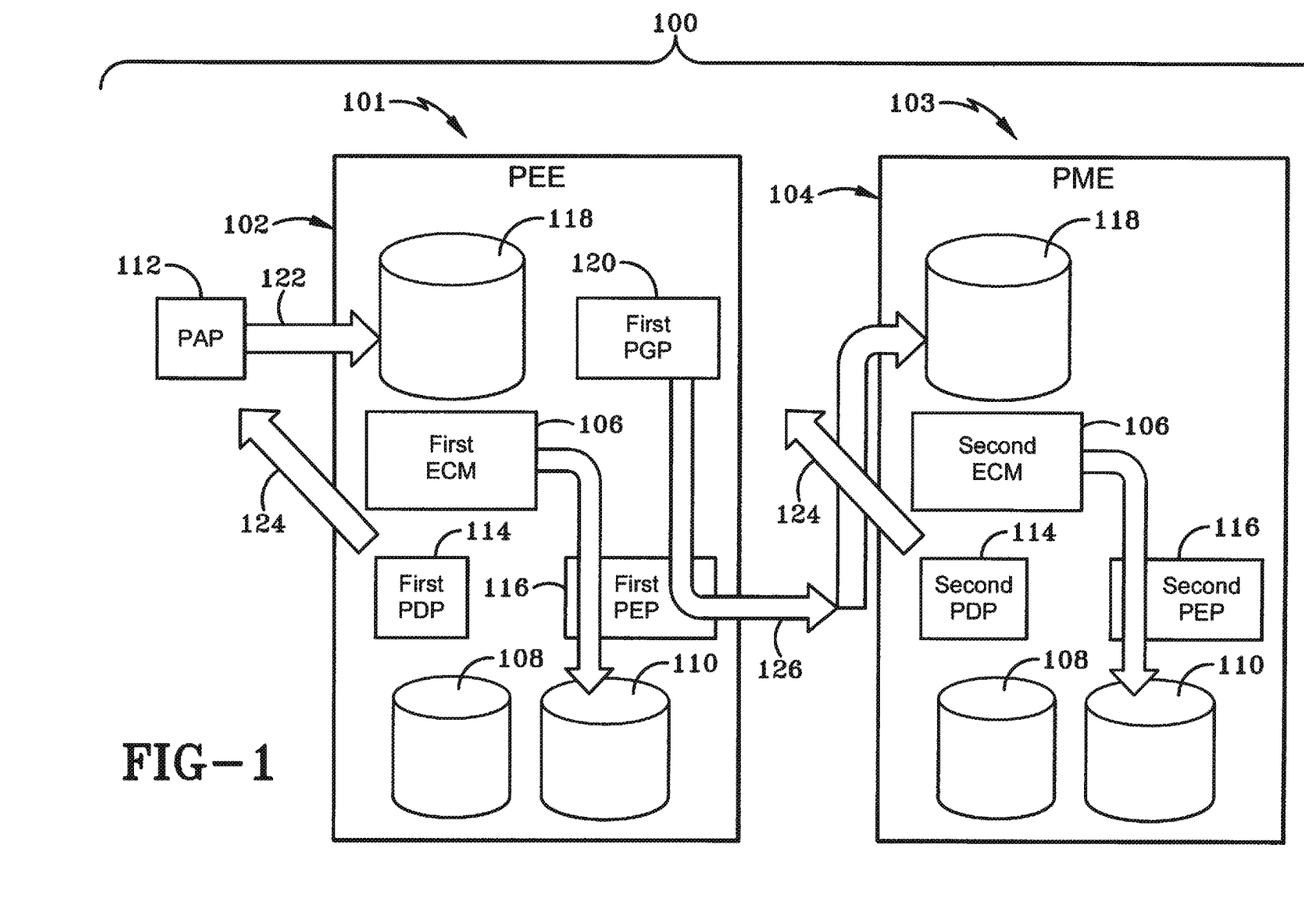
FIG. 1 illustrates a set of policy processing elements and how they can be connected.

FIG. 1 illustrates a set of policy processing elements and how they can be connected. To appreciate this diagram certain key terms should be understood. For the context of this application the following definitions will hold as defined in Table 1:

TABLE 1

| Term | Description |
| --- | --- |
| Static Rule | An instruction or set of instructions that is expressible in some language to accomplish some useful functions and is implemented by an element (hardware device, software routine, etc.). A static rule cannot be modified by an element for the duration of its deployed use. |
| Dynamic Rule | Same as a static rule except that instructions can be modified while an element is deployed. Hence it may require verification to show that it is in compliance with "Policies". |
| Policy | A dynamic rule that originates external to an element. As such other rules within the element may require validation that they are compliant with the dynamic external rule. |
| Policy Sink | An element (or point within an element) that "consumes" policy. This consumption will typically be composed of storing the policy, and then performing on-going evaluations based on the policy. |
| Policy Source | An element (or point within an element) that "creates" policy. Typically this policy is created through the processing of other policies and "state" or "condition" information. |
| Feedback | Any data reaching the policy source that may reflect on the performance of the elements controlled (directly or indirectly) by the policies generated at that source or other sources. Feedback may be passed between elements in order to reach particular policy sources that could be influenced by the feedback. Feedback may also be used as part of the operation of the system that does not influence policy but otherwise enhanced the performance of the system. |
| Conditions | Conditions are parameters which can describe the state of the environment of the system, or the state of the system itself. Conditions may be determined as a result of feedback. |
| Element | An electric hardware device, piece of software, or routine, capable of executing rules to perform some function and has the ability to interpret and implement the various rule sets it contains in the format that they are stored and received. Such elements may be arranged in real or virtual networks feeding policy and feedback to each other. |
| System | A set of interconnected elements. |
| Policy Controlled System | A system wherein the behavior of at least some of the elements are controlled by policy. |
| PEE | Policy Executive Element - Has the ability to accept (sink) policy and generate (source) policy. The generation of policy is by definition via rules. The PEE may also have the ability to generate dynamic rules not exposed to the outside world and perform other functions in addition to generating policy. |
| PME | Policy Managed Element - Has the ability to accept (sink) policy but NOT generate (source) policy. |
| PAP | Policy Administration Point - Point which can insert policies into the system but has no ability to execute rules relating to that policy. |
| PDP | Policy Decision Point - Point which evaluates action requests against policies before issuing decisions relating to the compliance of the actions request to the policy. |
| PEP | Policy Enforcement Point - Point which intercepts a functions actions and formulates an "action request" to be forwarded to the PDP to obtain an action decision (e.g. access to the resource is approved or rejected), and acts on the received decision. |

The set of elements defined in Table 1 are used to create a policy managed system 100 (FIG. 1). This policy managed system 100 comprises a first electronic device 101 including a policy executive element 102 and a second electronic device 103 including a policy managed element 104. First electronic device 101 may be a transceiver. Second electronic device 103 may be a receiver.

Most electronic systems developed are controlled by rules. In earlier days, these rules would be static. Elements of the systems would consist of devices or pieces of software, firmware, etc. whose behavior are determined by these "static rules" (instructions in a programming language, logic as described in a circuit diagram, etc.) that would be built and deployed (placed into use) with the intent of never being changed or modified for the duration of use. Thus, in a radio system, a static set of rules might be used to determine a device to generate a signal modulated with a quadrature phase shift keying (QPSK) method. The "design" allowing an apparatus to be built and implement that modulation method would (and must be) defined through a set of rules; e.g. a schematic determining digital and analog components with specific behavioral characteristics and operating within a set of parameters. The required behavioral characteristics of the components are exactly a set of rules governing the system's behavior. If the components did not satisfy these rules, the system would likely not operate as intended.

As time evolved, "adaptive" systems emerged. Adaptive systems have the ability to change the rules governing their behavior in response to "conditions". In essence, adaptive systems apply "meta-rules" or rules about rules. So for the radio system example, the apparatus could have the ability to generate several different modulations—e.g. binary phase shift keying (BPSK), QPSK, and 16-ary quadrature amplitude modulation (16-QAM). Each modulation would be generated using a different set of rules in the system. A "feedback" mechanism may exist, in the system, to determine what the signal to noise ratio (SNR) is at the intended receiver of the transmitted modulation. The transmitter in the radio system generating the modulated carrier could then use the SNR as a "condition" to determine which modulation to use so as to optimize the data throughput to the receiver. To do so, the transmitter would require a "higher level rule" determining which set of modulation rules to use given the SNR condition from the receiver (where the condition could also be for example "unknown"). This higher level rule would be a modulation "meta-rule" determining what set of rules is used for modulation. The meta-rule could be a "static rule" in that it would never change for the duration of use for the system. However the modulation rules set in use would constitute a set of "dynamic" rules in that they vary during the use of the system.

Within the context of this disclosure, both the transmitter generating the modulated signal and the receiver receiving the modulated signal are "elements" in the communications system performing useful functions. They would both implement a mix of static and dynamic rules. It is convenient for purposes of understanding the policy managed system 100 to group the portions of an implementation of one example system described here that selects "dynamic" rules for use in the system into a functional partition called an "element configuration manager" (ECM) 106. Such a function could also be called a "system strategy reasoned" function. This logical partition would contain that part of the element implementing the meta-rules controlling the dynamically configurable portions of the system 100. It is also convenient to think of the element as having a data store of "static" rules 108 and "dynamic" rules 110. These partitions are "logical" in that they do not have to tie to a specific implementation. Actual separate stores for the rules may not exist in the elements of the system. But the functioning of system elements can always be logically decomposed into these logical elements which are advantageous for understanding the functionality of the policy managed system 100.

Most recently, there has been great interest in "policy controlled" systems. The exact definition of policy varies from expert to expert and system to system. But for the context of this disclosure, policy is a set of rules that can be dynamically inserted (not necessarily during operation) into an element from a source external to that element. Elements that can accept such external rules (policies) 118 sets are termed here "Policy Managed" Elements. Systems which contain such elements are "policy managed systems" 100. The term "policy controlled systems" is often used interchangeable with policy managed systems.

Typically, policy is used to "inform" an element of necessary rules generally due to conditions beyond the elements ability to detect or possibly even comprehend. For instance, in a particular country, it may not be allowed to use 16-QAM because of perceptions that it requires more power and generates more noise on adjacent channels potentially interfering with other communications. So for political reasons within that particular country the radio system should not transmit that modulation, but within other countries it may be politically acceptable. It could be that prior to operating, the radio system needs to check via a wired connection for the local policies concerning use of 16-QAM. These policies would be a set of dynamic meta-rules that are loaded from an external source. The radio system would not need to understand the "conditions" resulting in the rules. Rather it would just need to have the ability to store and implement the rules themselves. Logically the radio would need to have a policy data base or store and some functions that can understand and apply the policy.

Note that policies often originate outside a system, and there must be an initial point of insertion for a policy. Logically such a point may be called a policy administration point (PAP) 112 that can send policy sinks over line 122 to the externally modifiable rules/policy database 118 of the PEE 102. It can be thought of as wholly separable from any other activity in the system (though in reality it may be implemented as a part of some system element).

Adding the ability to accept policy to an element is only useful if the element has the ability to understand the policy and configure itself so as to be conformant with that policy. For instance, if the policy is that 16-QAM is not allowed, the ECM 106 should configure the radio transmitter such that it cannot use that modulation (even if the SNR condition indicates that it would be advantageous to use 16-QAM). It is convenient to logically partition the reasoning (rules for making decisions within the element) into rules that configure the system 100 independent of policy (the ECM), and rules that determine if a configuration is compliant with policy. A set of rules that determines if a configuration is compliant with policy may be called a "policy conformance reasoner" or more generally a policy decision point (PDP) 114. A PDP 114 first determines what the applicable policy is, and then renders a policy decision concerning some action (such as configuring a function within an element). Typically an action is either "permitted" or "prohibited" by policy. Alternatively the terms "allowed" or "denied" can be used. The policy reason might also produce other responses such as "prohibited unless" or "permitted unless" or "not determinable" etc. An element may be logically structured such that the ECM must consult with a PDP 114 prior to changing the configuration in the element. The PDP 114 would then access the policy data base 118 and determine if the requested configuration is compliant with policy.

A stricter understanding would require that each policy managed element have a "policy enforcement point" (PEP) 116. A desired action by an element's functional components (including a reconfiguration by ECM 106) would be forwarded to the PEP 116, which would then format a policy question to the PDP 114 asking if a particular action should be permitted. The PEP 116 would then enforce the decision (either permitting or prohibiting the action). Depending on the system approach, the PEP 116 could even be applied to the actions taken as a result of the functional rules. For instance, in a radio transmitter, for each individual transmission, the PEP 116 could be consulted and in turn would consult with the PDP 114 to determine if it should be allowed. So each individual transmission would be checked to see, for example, if it includes 16-QAM. This is different to check if a configuration of the transmitter prohibits 16-QAM for any transmission. So in this example, the PEP 116 could be connected at two locations—at the output of the dynamic rules to determine if the output resulting from the executed rules really is compliant with policy, or at the configuration point for the dynamic rules, where the rules are actually selected to ensure the selected rules are compliant with policy.

An important point is that policies may actually allow a wide range of functional behavior in an element. So if the element contains dynamic rules, many different sets of dynamic rules may be acceptable in operation from a policy perspective. It is therefore useful to logically separate the functional processing that determines if a configuration/action is policy compliant (PDP) 114 from the functional processing that determine how to configure the element itself (the ECM) 106 and what actions to take. The ECM 106 may need to choose from a wide range of policy compliant configurations of the element so as to optimize the elements performance. The PDP 114 is concerned with whether a configuration is compliant with policy is highly relevant from the perspective of the policy management system. Similarly, the PEP 116 is purely concerned with enforcement of the policy rather than optimization of the system performance as this is what matters to the policy management system 100. The placement of the PEP 116 should be such that behavioral enforcement is provable. The PEP 116 may have a feedback path 124 to a PAP 112 or a policy generation point (PGP) 120. A PGP 120 is discussed below.

While a system with these functional components may seem overly complex, it is important to remember that the definitions are logical definitions meant to enable methods of configuring and managing the system. The actual implementation can be quite different. Also, it is possible that in an implementation of an "element" the PDP 114 is actually remote from a PEP 116. For instance, if a user on the web wants to access data stored on a website, the website may need to know if the user has permission to access the data. A PEP 116 may exist at the website and formulate a policy question about the user that is forwarded to an authentication agent or server. The authentication server would act as the PDP 114. The authentication server then determines if it is within policy for that user to access the data. There may be conditions for this as well, such as a password that the user may have entered. So the PDP 114 would look at the policies (users authorized to access the data), the conditions (the users name and password and the allowed password for that user name), and determine if the user is permitted to access the data. So if the user is on the permitted users list, and the user has entered a password, and the password entered matches the permitted password, then the authentication server POP 114 would send back a message to the PEP 116 that the access is permitted. The PEP 116 would then act on that decision and the user would be granted access to the data. So while the PEP 116 and PDP 114 can be purely logical constructs, they can also be separable functional components in an implementation.

An interesting point is that the prior art definition of elements might place the PEP 116 associated with an enforcement policy function in a different element than the associated PDP 114 since the functions are physically remote. This can cause "scope confusion" as the element containing the PEP 116 may itself have functions which are making policy decisions. For most configurations of this disclosure, that would not be permitted. The elements would be defined such that the PEP 116 and PDP 114 having the same scope are in the same element.

Another important concept relating to the PEP 116 and PDP 114 concepts is that of delegation. If a PEP 116 has asked a particular policy question once, it can form its own local store of policy decisions. These prior decisions can be taken as "policy" and may or may not be the full set of policy available at the PDP 114 and the prior decisions may or may not be up to date. Most likely the decisions collected represent a narrower set of policy (i.e. hypopolicy) and are not up to date. Rather than go back to the PDP 114 each time a policy decision is required, the PDP 114 could "delegate" its decision authority to the PEP 116, allowing it to decide things locally based on prior decision rendered. However this confuses the roles each element should play and a better logical partitioning of the system would be useful.

An issue that until now has not been well addressed in policy management architectures is the fact that some system elements may derive policy from other system elements. Policy does not always originate outside the system. Of course to do this, the policy generating element must apply a set of rules to create the new policy. Often some of the rules applied are themselves policy. So an important enhancement to the logical policy architecture described here is that of a Policy Generation Point (PGP) 120. A PGP is similar to an ECM 106 in that it is determining rules to be used, but the difference is that the rules are not for use within the generating element, but rather elements elsewhere in the system. An ECM 106 determines dynamic rules for use within the element. A PGP 120 determines dynamic rules (policies) for use outside the element. An element with the ability to create policy is a "Policy Executive Element" (PEE) 102 for purposes of this disclosure.

The operation of the PGP 120 would be the same as the ECM 106. In the process of creating a policy set, it would need to consult with the local PDP 114 to determine if the policy created is consistent with the policy in its own policy store. In determining the correct set of policies to use, various conditions may be considered. A PEP 116 may be inserted at the output of the PGP 120 so that the PEP 116 could receive policy sources to ensure that any output is directly evaluated for conformance with local policy. Note that in some representations, a separate PDP 114 and PEP 116 can alternatively be shown within a single element for each of the PGP 120 and ECM 106. This further decomposition would be within the spirit of the invention, but a single PDP 114 and PEP 116 is currently preferred.

An interesting point is that other versions of the policy managed system implementing different systems may implement different rule sets that may be very different. For example, a system could implement rules to conduct chemical reactions, or rules for routing data, or flying an airplane. The rules for any system (or method) could be described in terms of being static, changing over time, being applied within a system element, or being applied external to a system element. As such the system (or method) described herein for decomposing the rules in a system, the elements of a system, and the functional components used to manage behavior based on rules sets external to components can be applied to any system to enhance the understanding of the interactions between system elements and to better manage the system. Once the system is decomposed in this way, it is possible to define the specific interaction required to control/manage it and identify what is policy and what is not.

Also, it will be recognized to those skilled in that art that by grouping a "meta-rule" with the rules it governs, that a set of dynamic rules could be thought of a single static rule. This is within the spirit of the policy managed system. What matters is that the rules for those functional behaviors of concern to the policy management system are decomposed into their corresponding meta-rule and dynamic rule sets so that they can be managed.

Figure 2:
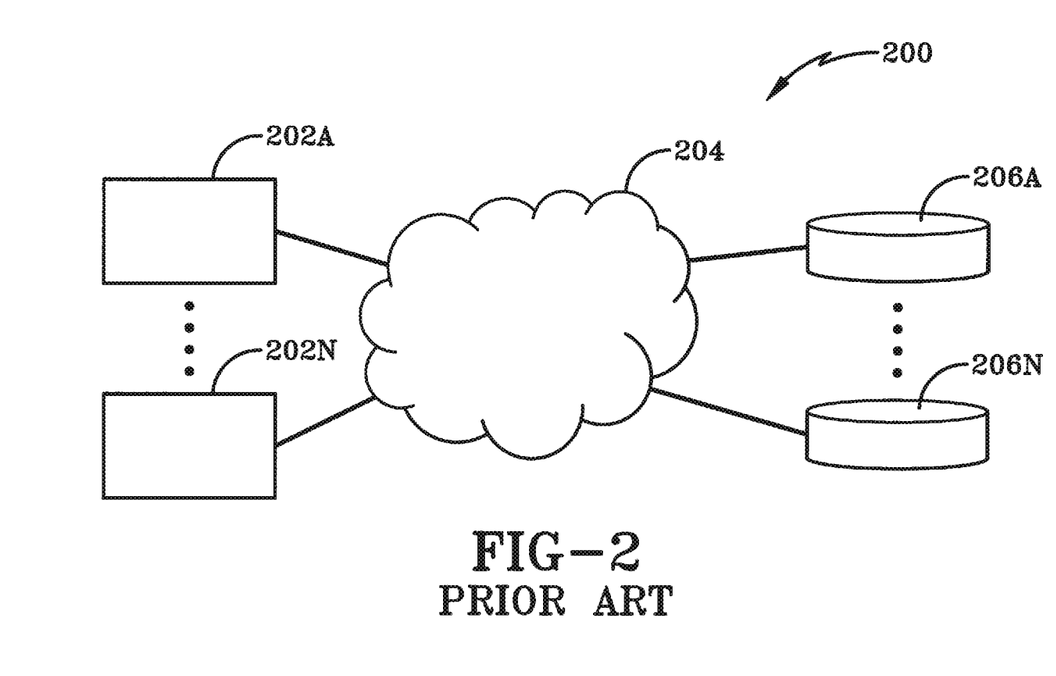
FIG. 2 illustrates a PRIOR ART description of the IETF Protocol to Access Whitespace (PAWS) databases.

As another example configuration of a policy managed system, consider the protocol to access white space (PAWS) database system 200, illustrated by FIG. 2. This figure is normally used in the literature to describe the interactions in the PAWS system 200. Master White Space devices (MWSD) 202A-N provide over the Internet 204 their location and authentication data to a database 206A-N using the PAWS. The data base conveys a set of radio frequencies the MSWD 202A-N and any devices slaved to it are allowed to use at that location (and some authentication data). Within the context of this embodiment, the set of frequencies is actually a policy used to manage the operation of the MWSD 202A-N, and any Slave White Space Devices (SWSD) it may represent. However this is not clear from the context of the diagram of FIG. 2, so the interactions may merely be viewed at data transactions.

Figure 3:
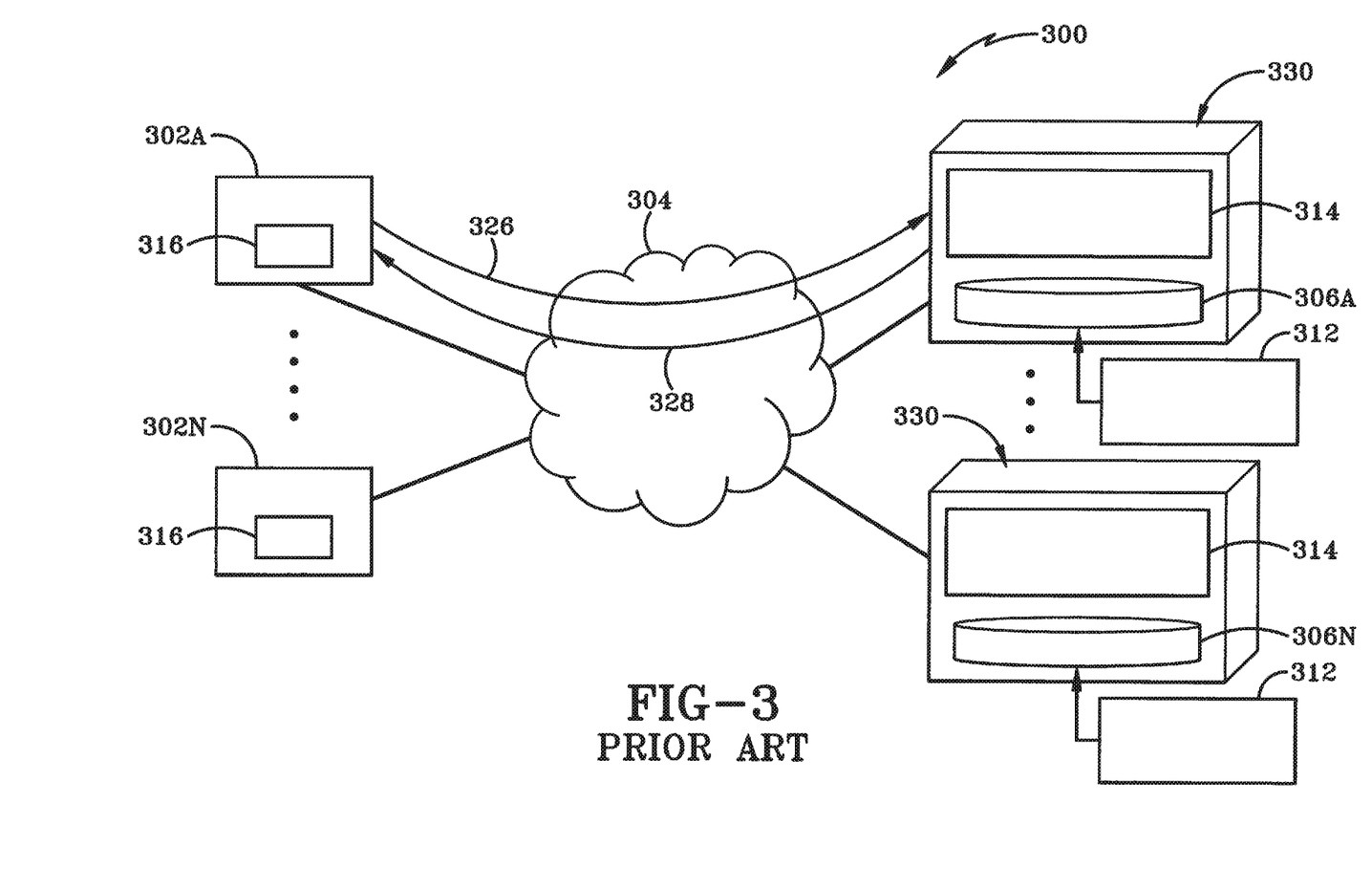
FIG. 3 illustrates a PRIOR ART description of the IETF Protocol to Access Whitespace (PAWS) databases with possible application of prior art policy management methods.

A "conventional" (prior art) decomposition of policy management functions within the PAWS system 300 (not considered as part of PAWS) is illustrated in prior art FIG. 3. In this diagram, there are the same interactions between elements, however the concepts of a PEP 316, PDP 314, and PAP 312 are applied in a conventional sense. Some authority has inserted a set of policies at the database describing permitted frequency use. One of the MWSD 302A-N wishes to take some action (transmit on a frequency). When it attempts this, the corresponding PEP 316 conveys a policy request over a location and authorization link 326 through a network 304 such as the internet to the appropriate PDP 314 which actually resides in a database 330 (now shown as including reasoning elements as well as the "database" of policies and known spectrum occupancy). The PDP 314 considers the policies and also conditions (such as what frequencies are already in use and where the use is located) and then sends back over a spectrum policy and authentication link 328 the permitted frequencies for use. The PEP 314 informs the corresponding MWSD 301A-N which selects an allowed frequency for itself and any slave devices and then transmits. But this composition of policy elements is faulty is that the PEP 316 is actually acting as much more than the PEP 316 as normally defined. A more exact decomposition of the system is required. The use of policy within the system 300 is not properly or fully represented.

Figure 4:
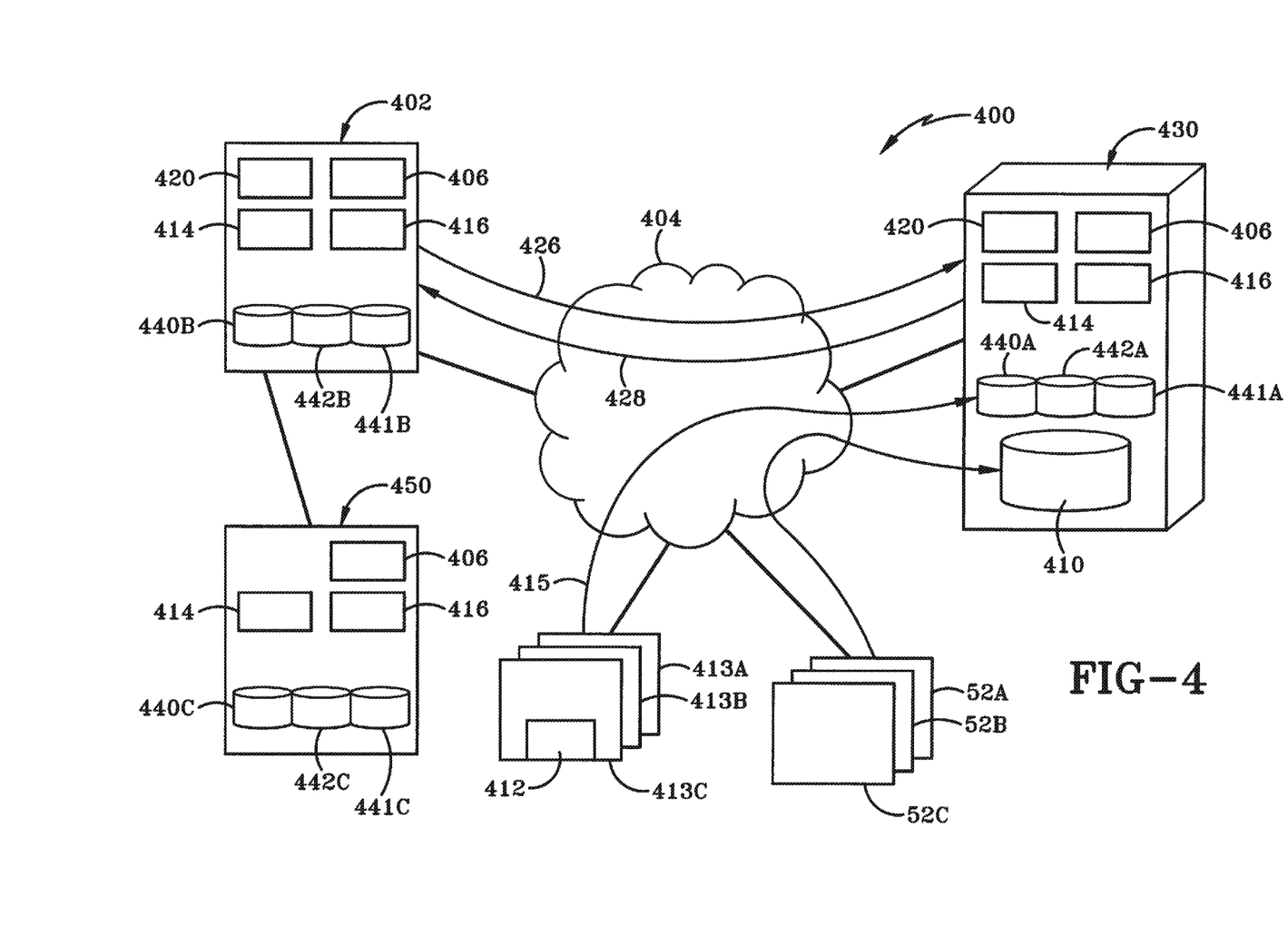
FIG. 4 illustrates an enhanced version of the IETF Protocol to Access Whitespace (PAWS) databases with an embodiment of the generic policy management methods.

FIG. 4 shows a representation of an enhanced version of the PAWS database system 400. Here the system 400 is decomposed into a hierarchical policy managed system with all the processing and interfaces required are exposed. While multiple databases and whitespace devices would exist, (as in FIG. 2) a simplified version is shown here focusing on the necessary processing and interactions. Here the "database" itself is represented as a PEE with all the components of a PEE explicitly identified. The PAP 412 with its policy sources 413A-C has been explicitly represented as a point on a network 404 such as the internet, and in fact there can be multiple PAPs 412 in other configurations. The policies from the PAP are conveyed over a policy information link 415 to a policy database or "store" (P1) 440 at the database provider 430. Clearly separated and represented is the spectrum occupancy data (conditions) 410 that must exist and be considered that also can originate elsewhere on the web (possibly in the whitespace devices themselves but not shown as such here). There would be a static set of rules (SR1) 441 locally present, but also the database 430 could include a dynamic rules set (DR1) 442 that would be determined by a local ECM 406 based on local policies and conditions. These dynamic rules could influence (for instance) how the PGP 420 operates. But these rules would never leave the database provider 430 "element" so they are not considered policy. Upon request from a MWSD 402 over a location and authentication link 426, the PGP 420 would derive a set of policies (allowed frequencies, but possible also allowed modulations, spectrum masks, and protocols such as carrier sense multiple access, etc.) and make these available over a spectrum policy and authentication link 428 to the policy data base (P2) 440B of the MWSD 402. These policies would go through the PEP 416 local to the database provider which would consult with the local PDP 414 to ensure the policies pushed to the MWSD 402 were consistent with the policies resident in the database provider 430. The PGP 420 and PDP 414 would both consider conditions such as the location of the MWSD 402 and current spectrum usage from the data base in determining the set of policies pushed.

The MWSD 402 is also a PEE with its own set of local functions. It would have an ECM 406 that would decide which of the allowed spectrum occupancies behaviors (which could be as simple as what frequency to transmit on) to use. When configuring itself, the local PEP 416 would enforce that the MWSD 402 configuration is allowed based on the locally loaded policies (in consultation with the local PDP 414). The MWSD 402 would then have its own dynamic rules (DR2) 442B that are consistent with local policy. The MWSD 402 might also push a set of policies to slave devices. A local PGP 420 would be used (configured by the local ECM 406) to generate polices to be pushed to SWSD 450. Policies pushed would go through the local PEP 416 which would consult with the local PDP 414 to ensure compliance. The SWSD 450 would not need the ability to generate policy so they would be a pure PME. They would have no PGP, but would still have all the facilities required to process policy locally (a PDP 414, a PEP 416, policy store, etc.). As illustrated, the system 400 can also include other spectrum data sources 52A-C.

One clear advantage of the described policy processing system 400 is that interactions are always "within an element". This makes their association clearer. Note that the implementation of the element may entail that its functions are remote from each other. Also hierarchical processing of policy is now possible with virtually any number of layers. The ability to derive policies from policies is explicitly represented and supported. All the interfaces as now exposed, for the database revealing the need for standardization, for the policy interfaces into the database provider, as well as spectrum sources to the database provider. Since the system 400 is hierarchical, a similar interface can be used for policy between elements, but also for the functions as decomposed within elements. For the representations of policy the CoRaL language could be used. However many other languages (as say available from Shared Spectrum Company) could also be used for the representation of policy in the system. The implementation of the Generic Policy Management Method for the White Space Database/PAWS leveraging the policy language available from Shared Spectrum Company could be used in some configuration of this system 400.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
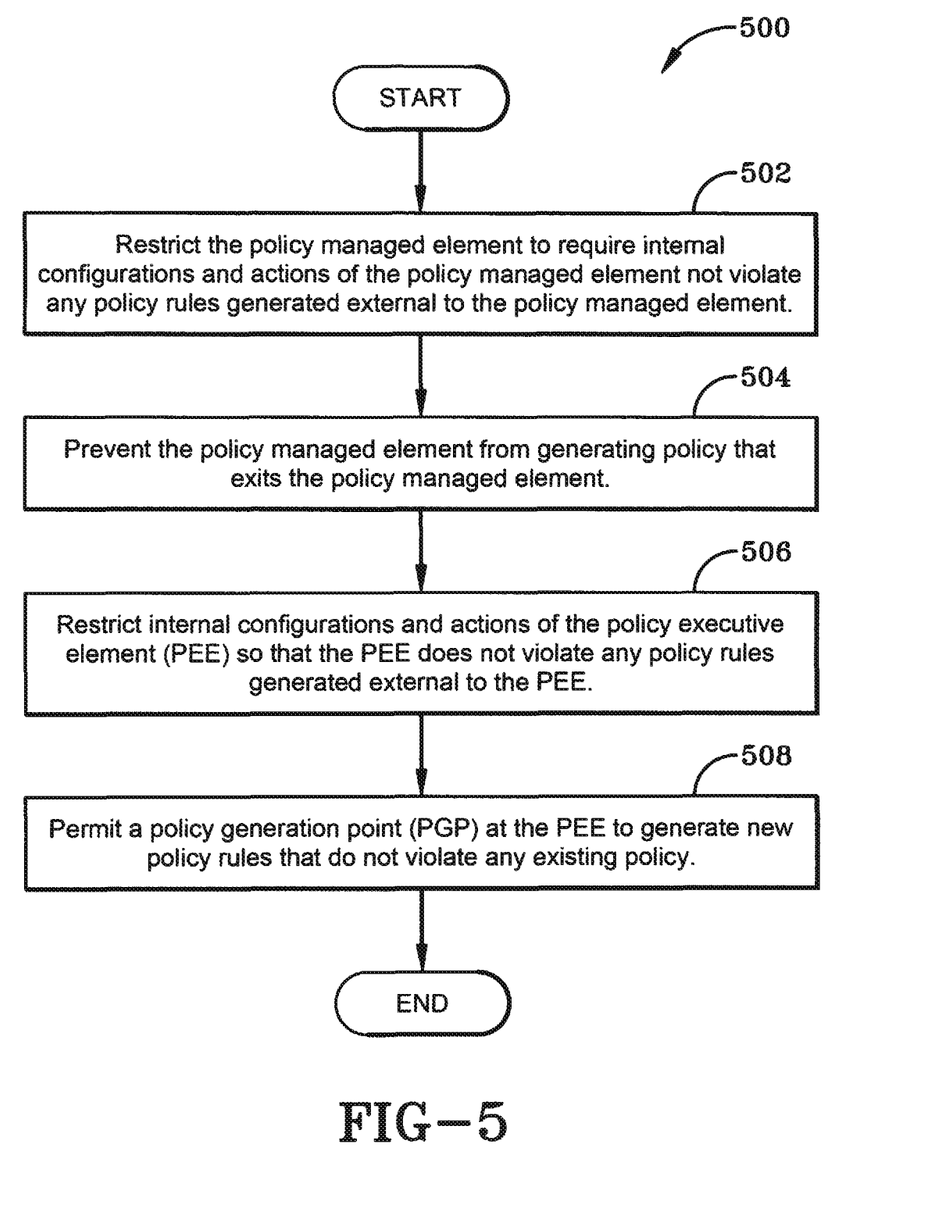
FIG. 5 is an example method of controlling a policy managed system.

FIG. 5 illustrates a method 500 of managing a policy managed system that includes at policy managed element. The method 500 restricts the policy managed element, at 502, to require internal configurations and actions of the policy managed element not violate any policy rules generated external to the policy managed element. The method 500 also prevents, at 504, the policy managed element from generating policy that exits the policy managed element. The method 500, at a policy executive element (PEE) located remote from the policy managed element, restricts internal configurations and actions of the PEE, at 506, so that the PEE does not violate any policy rules generated external to the PEE. The PEE includes a policy generation point (PGP) that the method 500 allows to generate new policy rules that do not violate any existing policy, at 508, and provides the new policy rules to the policy managed element.

In accordance with one exemplary aspect of the present invention, a policy managed system may comprise: a network creating a communicative link between at least two electronic devices; a first electronic device connected to the network, the first electronic device comprising: (a) a policy executive element (PEE) including the ability to accept (sink) policy and generate (source) policy; (b) a first element configuration manager (ECM) configured to generate rules and policy for use within the PEE; (c) a first policy decision manager (PDP) configured to evaluate an action request against policies before determining if the action conforms with policies and is permitted to execute; (d) a first policy enforcement manager (PEP) configured to send an action request to the first PDP for an action decision to determine if the action conforms with policies; and (e) a first policy generation point (PGP) configured to generate policy that is used by other elements across the system; a second electronic device connected to the network and in communication with the first electronic device through the network, the second electronic device comprising: (a) a policy managed element (PME) including the ability to accept (sink) policy but not generate (source) policy, (b) a second ECM configured to generate rules and policy for use within the PME; (c) a second PDP configured to evaluate an action request against policies before determining if the action conforms with policies and is permitted to execute; and (d) a second PEP configured to send an action request to the second PDP for an action decision to determine if the action conforms with policies; and wherein the policy managed system provides a hieratical structure of policy management that can be applied to a variety of different policy management applications without being dependent on specific policy formats and underlying conveyance protocols.

Additionally, in accordance with this exemplary aspect, the PME may comprise dynamic internal rules for use solely within the policy managed element and wherein the dynamic internal rules are processed by the ECM of the policy managed element. Also, the PME may comprise externally modifiable policy rules that can be dynamically inserted into the PME logic from the PEE logic. Further, the PME may comprise static internal rules that do not change when the policy managed system is operating.

Further, in accordance with this exemplary aspect, the first ECM may comprise logic for implementing the meta-rules controlling dynamically configurable portions of the policy managed system.

Additionally, in accordance with this exemplary aspect, the PGP may comprise a policy source link passing through the network to the policy managed element over which the PGP can send policy rules to the policy managed element.

Further, in accordance with this exemplary aspect, the policy managed system may also include a policy administrative point (PAP) for receiving a set of external policy rules external to the policy managed system and for injecting the external policy rules into the policy managed system. The policy managed rules may comprise current frequency spectrum data and policy rules for selecting a frequency modulation technique. And, the frequency modulation technique may comprise quadrature amplitude modulation (QAM). The PAP may be directly connected to the network.

Additionally, in accordance with this exemplary aspect, the second ECM may comprise verification logic requiring the second ECM to check with the second PDP before changing to a new configuration of the PME to be sure the new configuration does not violate any current policy rules. The PME may comprise a policy database for storing all current policy rules.

Further, in accordance with this exemplary aspect, the second PEP may comprise question formatting logic allowing, upon the ECM of the policy managed element requesting to change a configuration of the policy managed element, the second PEP to generate a policy question to the second PDP to determine if the change of the configuration of the PME violates existing policy.

Additionally, in accordance with this exemplary aspect, in the policy managed system the second electronic device can be a radio transmitter, and wherein the second PEP consults with the second PDP before each radio transmission to determine if each radio transmission violates any current policy and should or should not be permitted.

Further, in accordance with this exemplary aspect, the first PEP is located at an output of the PGP to ensure any PGP output conforms with local policy of the PEE.

With continued reference to this exemplary aspect, the first electronic device is a master white space device (MWSD) and the second electronic device is a slave white space device (SWSD). In this configuration, the policy managed system may further comprise: a database provider connected to the network wherein the database provider comprises: (a) a second PGP; (b) a third ECM; (c) a third PDP; and (d) a third PEP. With continued reference to this configuration the second PGP derives a set of policies upon a request from the MWSD, to set of policies including at least one of the group of: allowed frequencies, allowed modulations, a spectrum mask and a transmission protocol, and wherein the second PGP will provide the derived set of policies to the MWSD.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the example embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the example embodiment" does not necessarily refer to the same embodiment, though it may.

What is claimed is:

1. A policy managed system comprising:
a network creating a communicative link between at least two electronic devices;
a first electronic device connected to the network, the first electronic device comprising:
  (a) a policy executive element (PEE) including the ability to accept (sink) policy and generate (source) policy and generate dynamic rules not exposed to an outside world,
  (b) a first element configuration manager (ECM) configured to generate rules and policy for use within the PEE, wherein the first ECM selects dynamic rules for use in the system,
  (c) a first policy decision manager (PDP) configured to evaluate an action request against policies before determining if the action conforms and complies with policies and the action is permitted to execute,
  (d) a first policy enforcement manager (PEP) configured to send an action request to the first PDP for an action decision to determine if the action conforms with policies, wherein the PEP and the PDP have the same scope and are in the PEE, and
  (e) a first policy generation point (PGP) configured to generate policy that is used by elements outside the PEE, wherein the PEP is inserted at an output of the PGP to receive policy sources to ensure that any output is directly evaluated for conformance with local policy;
a second electronic device connected to the network and in communication with the first electronic device through the network, the second electronic device comprising:
  (a) a policy managed element (PME) including the ability to accept (sink) policy but not generate (source) policy, wherein the PME is restricted so that internal configurations and actions of the PME do not violate any rules generated external to the PME,
  (b) a second ECM external to the PME configured to generate rules and policy for use within the PME,
  (c) a second PDP configured to evaluate an action request against policies before determining if the action conforms and complies with policies and is permitted to execute, and
  (d) a second PEP configured to send an action request to the second PDP for an action decision to determine if the action conforms with policies; and
wherein the policy managed system provides a hierarchical structure of policy management that can be applied via an interface to a variety of different policy management applications in different elements without being dependent on specific policy formats and underlying conveyance protocols.

2. The policy managed system of claim 1 wherein the PME comprises:
dynamic internal rules for use solely within the policy managed element and wherein the dynamic internal rules are processed by the second ECM.

3. The policy managed system of claim 1 wherein the PME comprises:
externally modifiable policy rules that can be dynamically inserted into the PME from the PEE.

4. The policy managed system of claim 1 wherein the PME comprises:
static internal rules that do not change when the policy managed system is operating.

5. The policy managed system of claim 1 wherein the first ECM comprises:
logic for implementing meta-rules controlling dynamically configurable portions of the policy managed system.

6. The policy managed system of claim 1 wherein the PGP comprises:
a policy source link passing through the network to the policy managed element over which the PGP can send policy rules to the policy managed element.

7. The policy managed system of claim 1 further comprising:
a policy administrative point (PAP) for receiving a set of external policy rules external to the policy managed system and for injecting the external policy rules into the policy managed system.

8. The policy managed system of claim 7 wherein the external policy managed rules comprise:
current frequency spectrum data and policy rules for selecting a frequency modulation technique.

9. The policy managed system of claim 8 wherein the frequency modulation technique comprises quadrature amplitude modulation (QAM).

10. The policy managed system of claim 7 wherein the PAP is directly connected to the network.

11. The policy managed system of claim 1, wherein the second ECM comprises:
   verification logic requiring the second ECM to check with the second PDP before changing to a new configuration of the PME to be sure the new configuration does not violate current policy rules.

12. The policy managed system of claim 1, wherein PME comprises:
   a policy database for storing all current policy rules.

13. The policy managed system of claim 1 wherein the second PEP comprises:
   question formatting logic allowing, upon the ECM of the policy managed element requesting to change a configuration of the policy managed element, the second PEP to generate a policy question to the second PDP to determine if the change to the configuration of the PME violates existing policy.

14. The policy managed system of claim 1 wherein the first electronic device is a transceiver and the second electronic device is a radio transmitter; and
   wherein the second PEP consults with the second PDP before each radio transmission to determine if each radio transmission violates any current policy and should or should not be permitted.

15. The policy managed system of claim 1 wherein the first PEP is located at an output of the PGP to ensure any PGP output conforms with local policy of the PEE.

16. The policy managed system of claim 1 wherein the first electronic device is a master white space device (MWSD) and the second electronic device is a slave white space device (SWSD).

17. The policy managed system of claim 16 further comprising:
   a database provider connected to the network wherein the database provider comprises:
   (a) a second PGP;
   (b) a third ECM;
   (c) a third PDP; and
   (d) a third PEP.

18. The policy managed system of claim 17 wherein the second PGP derives a set of policies upon a request from the MWSD, to set of policies including at least one of the group of: allowed frequencies, allowed modulations, a spectrum mask and a transmission protocol, and wherein the second PGP will provide the derived set of policies to the MWSD.

19. A method of managing a policy managed system comprising the steps of:
   providing a first electronic device including a policy executive element (PEE) and a remote second electronic device including a policy managed element (PME) linked via a network, wherein the PEE accepts and generates policy dynamic rules not exposed to an outside world, and wherein the PME is restricted so that internal configurations and actions of the PME do not violate any rules generated external to the PME;
   restricting internal configurations and actions of the PME to not violate any policy rules generated external to the PME, wherein the PME is prevented from generating policy that exits the PME; and
   restricting internal configurations and actions of the PEE to not violate any policy rules generated external to the PEE, and wherein the PEE includes a policy generation point (PGP) that generates new policy rules that do not violate any existing policy and provides the new policy rules to the policy managed element for use by elements outside the PEE.

20. The method of managing a policy managed system of claim 19 further comprising the step of:
   generating at a policy administration point (PAP) new global policies and injecting the new global policies into the policy managed system.

* * * * *